(12) United States Patent
Reed

(10) Patent No.: US 11,304,364 B1
(45) Date of Patent: Apr. 19, 2022

(54) DAMPENING SYSTEM FOR A MANURE INJECTION SYSTEM

(71) Applicant: VTI, L.L.C., Washington, IA (US)

(72) Inventor: Phil Reed, Washington, IA (US)

(73) Assignee: VTI, L.L.C., Washington, IA (US)

( * ) Notice: Subject to any disclaimer, the term of this patent is extended or adjusted under 35 U.S.C. 154(b) by 0 days.

(21) Appl. No.: 17/406,719

(22) Filed: Aug. 19, 2021

Related U.S. Application Data

(60) Provisional application No. 63/195,468, filed on Jun. 1, 2021.

(51) Int. Cl.
*A01C 23/00* (2006.01)
*A01C 23/02* (2006.01)
*A01M 7/00* (2006.01)

(52) U.S. Cl.
CPC .......... *A01C 23/008* (2013.01); *A01C 23/021* (2013.01); *A01M 7/0053* (2013.01)

(58) Field of Classification Search
CPC ..... A01C 23/008; A01C 23/021; A01C 23/00; A01C 23/02; A01M 7/0053; A01M 7/005; A01M 7/00
See application file for complete search history.

(56) References Cited

U.S. PATENT DOCUMENTS

| | | | | |
|---|---|---|---|---|
| 3,115,191 A | * | 12/1963 | Ward | A01B 5/08 172/162 |
| 3,499,656 A | * | 3/1970 | Calmusky | B25D 17/082 279/19.1 |
| 9,137,938 B2 | | 9/2015 | Zimmerman | |

FOREIGN PATENT DOCUMENTS

AU          8079298 A  *  2/1999  ............. A01B 15/18

* cited by examiner

*Primary Examiner* — Christopher J. Novosad
(74) *Attorney, Agent, or Firm* — Shuttleworth & Ingersoll, PLC; Jason R. Sytsma

(57) ABSTRACT

A swivel bar is operatively connected by a bracket assembly to a toolbar, such that the swivel bar pivots back and forth in the horizontal plane about a pivot. A resilient device is positioned inside the swivel bar where the pivot is combined to the bracket assembly and extends through the swivel bar. At least one agricultural implement and preferably two agricultural implements are connected to the swivel bar on opposite sides of the pivot.

19 Claims, 5 Drawing Sheets

DAMPENING SYSTEM FOR A MANURE INJECTION SYSTEM

CROSS-REFERENCE TO RELATED APPLICATIONS

The present application claims the benefit of U.S. Provisional Patent Application No. 63/195,468 filed Jun. 1, 2021, which is hereby incorporated herein by reference.

TECHNICAL FIELD

This disclosure relates to agricultural implements, and, more specifically, the present disclosure relates to a toolbar which provides a horizontal dampening system.

BACKGROUND INFORMATION

Historically, livestock waste, particularly in solid form, has been spread on the surface of the soil by a manure spreader using a flail to fling the material to the rear. A more modem side-discharge spreader also discharges the material on the surface of the soil. The advent of confinement systems for animals, which include pits below the confinement area, produces a large amount of animal waste, which must be handled and disposed of in a slurry form. Typically, the slurry is pumped into a large tank carried by a wagon, but it is still, for the most part, spread or sprayed on the surface of the soil.

This procedure has, as a principle objection, a strong odor, which resides after the waste is spread. Moreover, surface spreading of animal waste creates a hazard with the potential runoff of nitrates into rivers and streams or seeping of the material into ground water. This is objectionable because livestock waste is high in nitrogen, and with increasing concern with the quality of drinking water, this procedure is becoming less and less acceptable.

Various methods have been proposed for depositing the slurry into the ground. An improved device and method was previously disclosed by the inventor in U.S. Pat. No. 8,550,019 titled, Slurry Applicator for an Agriculture Machine. This device deposits slurry into the ground by cutting a trough in the ground surface soil with a rotating member, displacing a majority the soil from the trough upwardly and airborne with respect to the ground surface, and directing the soil downward into the trough after the slurry has been deposited therein to cover the slurry with the soil.

Improvements to these machines include, for example, self-centering pivots, such as disclosed in U.S. Pat. No. 9,137,938. This unit, however, is expensive and complex to manufacture. Accordingly, there is a need for a horizontal dampening system in the agriculture machine that dampens the horizontal movement of the row unit as it travels the contours of a field.

SUMMARY

According to this disclosure, a manure injection system is disclosed. The manure injecting system comprises of a toolbar operatively connected to a tanker or tractor by a hitch. A swivel bar is operatively connected by a bracket assembly to the toolbar, such that the swivel bar pivots back and forth in the horizontal plane about a pivot. A resilient device is positioned inside the swivel bar where the pivot is combined to the bracket assembly and extends through the swivel bar. At least one agricultural implement and preferably two agricultural implements are connected to the swivel bar on opposite sides of the pivot.

In an embodiment, the resilient device is a torsion block, which can be fully contained inside the swivel bar. The resilient device can comprise an outer casing comprising a plurality of sides, an inner tube comprising a plurality of sides, and a plurality of inserts each one of which is positioned between one of the plurality of sides of the inner tube and the outer casing.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
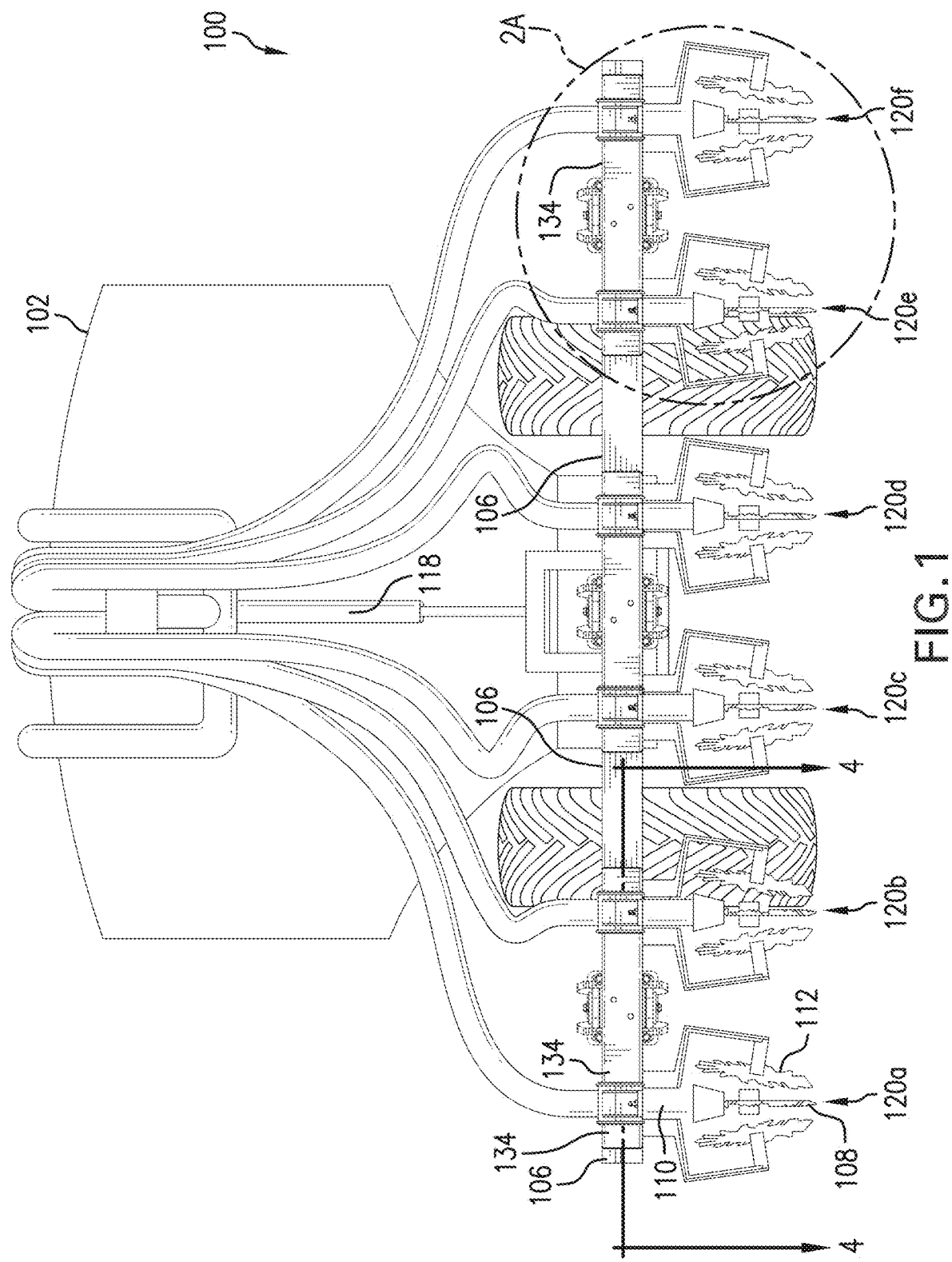
FIG. 1 is an illustration of a manure injection system according to this disclosure.

Referring to FIG. 1, shown is manure injection system 100 according to this disclosure. A tractor pulls a tanker 102 full of liquid manure slurry through a field. Attached to the back end of tanker 102 is a toolbar 106 connected by a hitch. At least one manure injector 120 and preferably a plurality of manure injectors 120*a*-120*f* are combined to tool bar 106 for injecting liquid manure slurry from tanker 102 into the ground. Tanker 102 has conventional pumps for moving the slurry through hoses 110 each of which is connected to a corresponding one of manure injectors 120*a*-120*f* on toolbar 106. In other embodiments, tanker 102 can be omitted and replaced with a drag-hose where liquid manure slurry is pumped from a pit through long hose to manure injector 120. A cylinder 118 connected between tanker 102 and toolbar 106 when actuated pushes toolbar 106, and thus manure injectors 120*a*-120*f* into the ground for operation.

Manure injector 120 injects the slurry into ground by creating trench, adding liquid slurry to the trench, and then covering the trench back up. Slurry application or injection can be done in a number of ways, for example, by dragging a knife through the ground to create the trench or using a rotating coulter blade to displace the soil to create the trench.

In the illustrated embodiment, manure injector 120 is comprised generally of a coulter blade 108 to open a trough in the ground, hose 110 positioned behind coulter blade 108 to deposit slurry into the trough, and a pair of containment wheels 112 to cover the trough. U.S. Pat. No. 8,550,019 titled, Slurry Applicator for an Agriculture Machine describes more particularly the operation of manure injector 120 illustrated herein, which patent is hereby incorporated by reference herein.

Toolbar 106 extends lengthwise and perpendicular to the direction of travel of tanker 102. In the conventional manner, manure injectors 120*a*-120*f* are spaced approximately thirty inches apart corresponding roughly to the distance between rows in a field along a toolbar 106. A person skilled in the art will readily realize that a number of such units can be located in spaced relation, side by side, and at any lateral spacing desired by the farmer or operator. As the number of manure injectors 120 increases, one of the problems that is introduced is the ability to properly steer all manure injectors 120. This may be especially problematic where contour farming practices are followed, maneuvering around objects in the field, or where the ground is uneven, or other irregularities are present.

Figure 2:
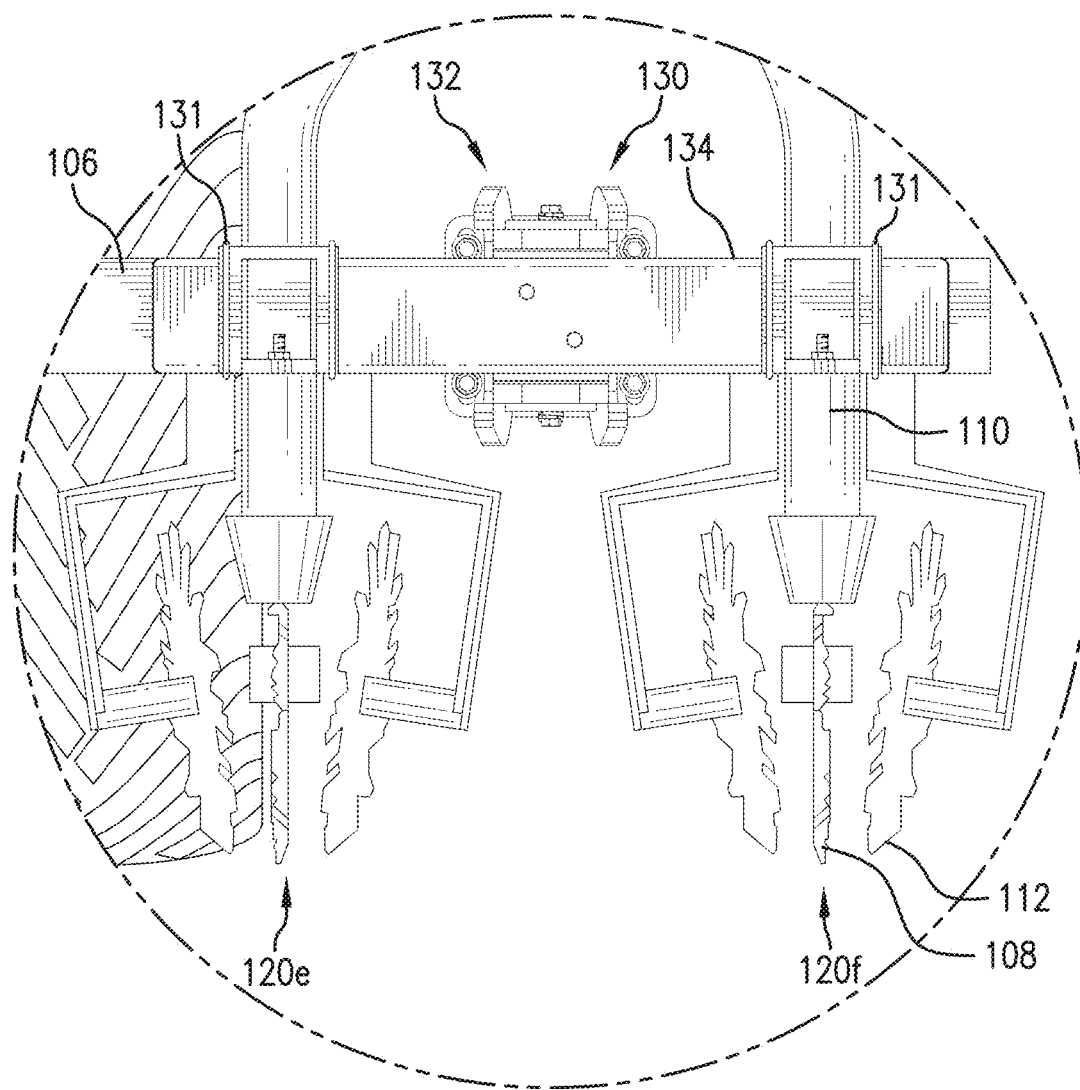
FIG. 2 is a close-up view of a manure injector of the manure injection system of FIG. 1.

To overcome this problem a dampening system 130 is connected between toolbar 106 and manure injector 120. As can be seen more clearly in FIG. 2, in the illustrated embodiment, two manure injectors 120e, 120f can be connected by respective brackets 131 to dampening system 130.

Figure 3:
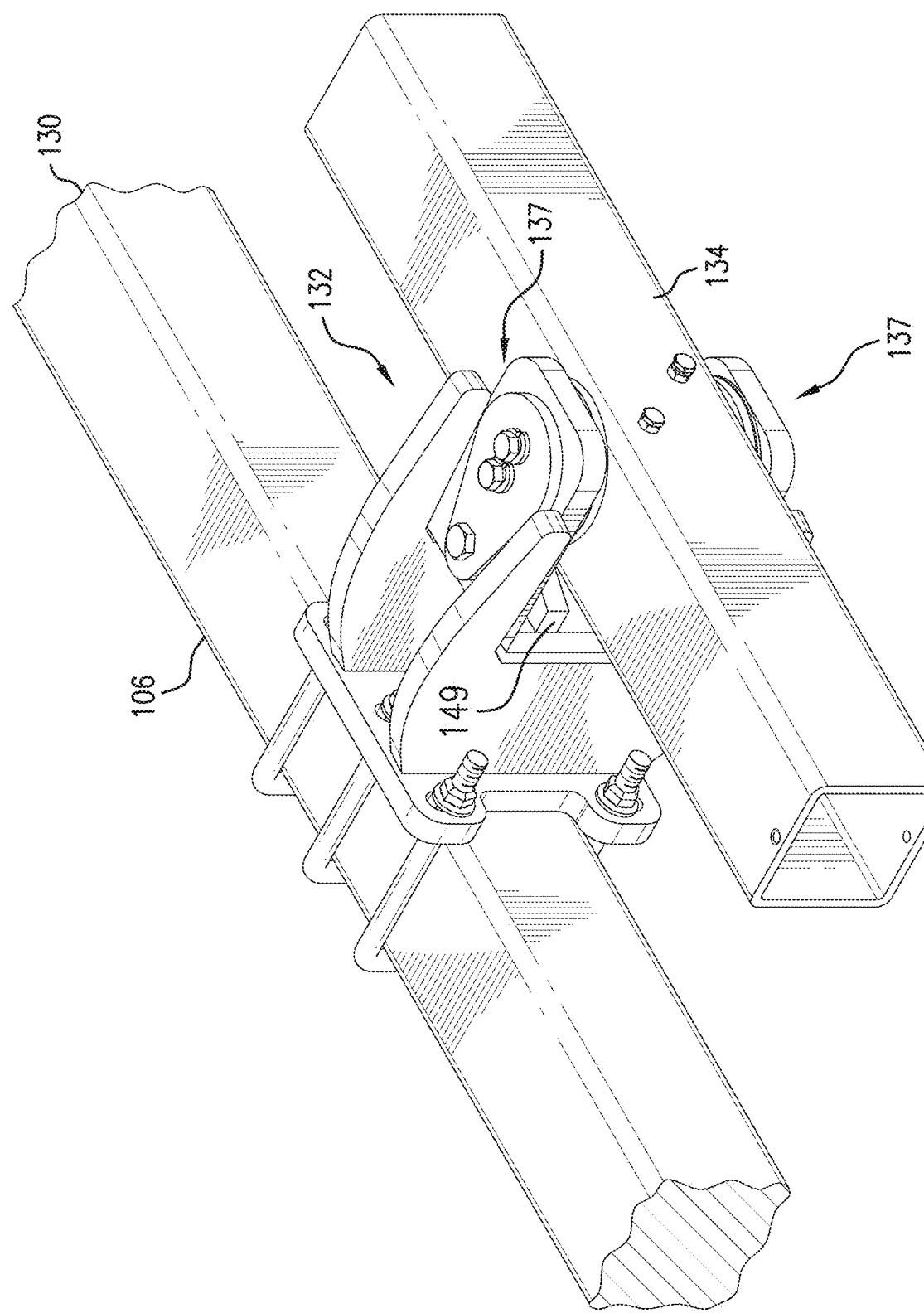
FIG. 3 is a perspective view of a dampening system attached to a tool bar.
Figure 4:
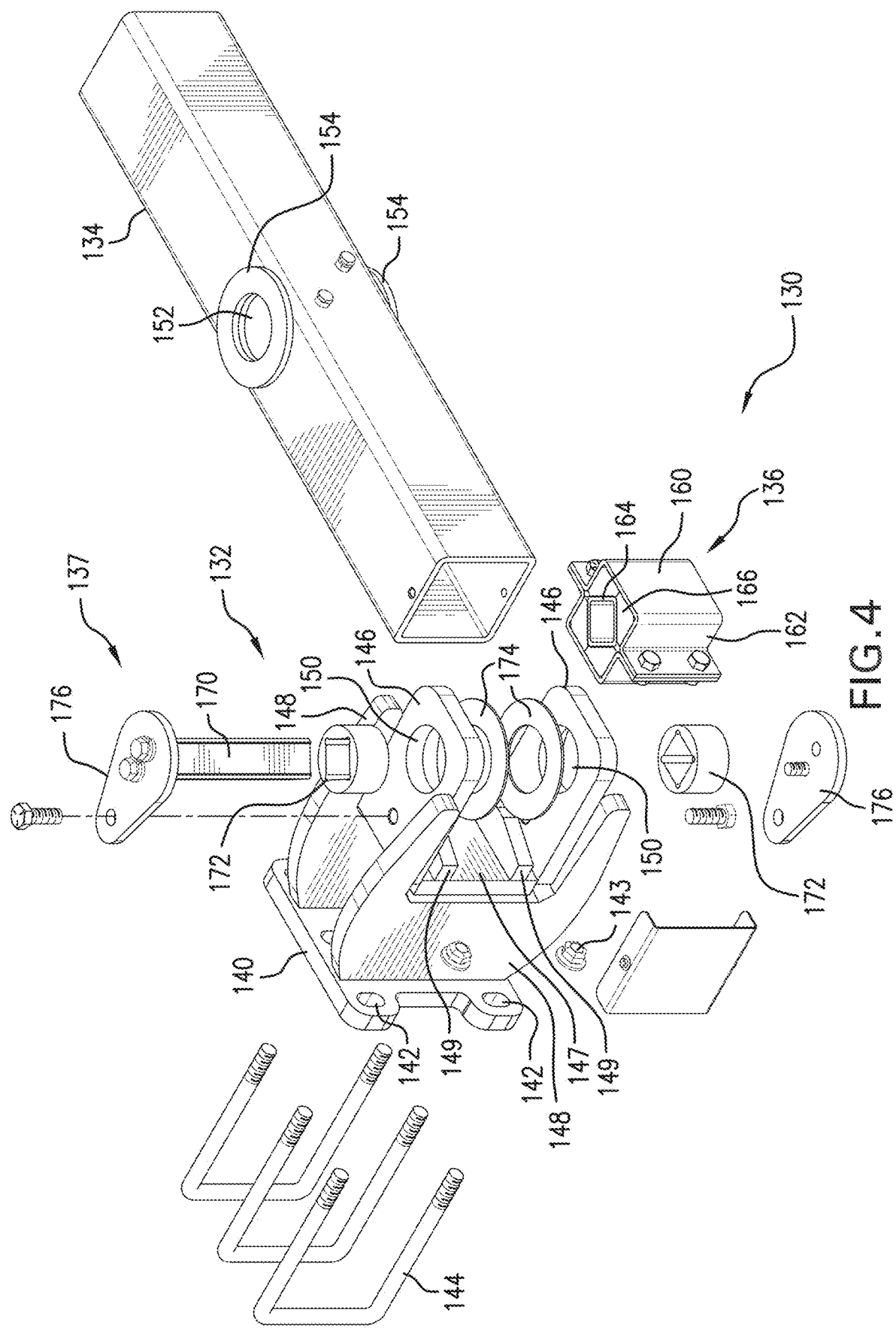
FIG. 4 is an exploded view of the dampening system of FIG. 3.

FIG. 3 is a perspective view of dampening system 130 attached to tool bar 106. Dampening system 130 includes generally a swivel bar 134 connected to a bracket assembly 132 by a pivot assembly 137. FIG. 4 shows an exploded view of dampening system 130. From this view it can be seen that dampening system 132 comprises of a pivot 170 biased against an internal resilient device 136 which allows swivel bar 134 to pivot back and forth about pivot 170 in the horizontal plane.

More specifically, dampening system 130 comprises of a bracket assembly 132, which is designed to attach dampening system 130 to toolbar 106, a swivel bar 134 to which at least one manure injector 120 is attached, and a resilient device 136 positioned between bracket assembly 132 and swivel bar 134 to urge swivel bar 134 back to position.

Bracket assembly 132 more specifically comprises of a back plate 140 that abuts to toolbar 106 and is configured for receiving fasteners 144 to attach bracket assembly 132 to toolbar 106. In the illustrated embodiment, fasteners 144 are u-bolts inserted through holes 142 in back plate 140 and attached by nuts 143. While bracket assembly 132 can be attached to toolbar 106 in any number of ways, doing so in the manner shown in the illustrated embodiment makes dampening system 130 easily adjustable laterally side-to-side along toolbar 106.

A pair of mounting plates 146, which are spaced apart vertically and positioned on opposite sides of swivel bar 134, are attached to back plate 140. Mounting plates 146 can be attached directly to back plate 140 or combined via laterally spaced apart support members 148 that are combined on opposite sides of mounting plates 146 and combined to back plate 140. In the illustrated embodiment, support members 148 are welded to back plate 140 and mounting plates 146 are welded to support members 148. Each mounting plate of pair of mounting plates 146 comprises of a through hole 150 which is aligned with a through hole 152 in swivel bar 134.

Inside swivel bar 134 is resilient device 136. Resilient device 136 is positioned between swivel bar 134 and bracket assembly 132 to urge the swivel bar back to position. In a neutral, toolbar 106 extends laterally and perpendicular with respect to the direction of travel of the tractor through the field. Swivel bar 134 similarly, in the neutral position, extends parallel with respect to toolbar 106 and perpendicular with respect to the direction of travel. Any oscillations, jostling of swivel bar 134 will be absorbed and dampened by resilient device 136 as it pivots in the horizontal plane.

Resilient device 136 can comprise a torsion block 160 which comprises of an outer casing 162 comprising a plurality of sides, an inner tube 164 comprising a plurality of sides, and a plurality of inserts 166 each one of which is positioned between one of the plurality of sides of inner tube 164 and outer casing 162. In the illustrated embodiment, outer casing 162 of torsion block 160 comprises four sides, and inner tube 164 comprises four sides. Inner tube 164 is rotated forty five degrees (45°) with respect to outer casing 162 such that each one of the four sides of inner tube 164 is rotated forty five degrees with respect to a corresponding one of the four sides of outer casing 162. A corresponding four inserts 166 are shown each one of which is positioned between one of the four sides of inner tube 164 and outer casing 162. While four sides for each of outer casing 162 and inner tube 164 are shown, one skilled in the art will recognize that other geometric cross-sections can be provided to decrease or increase the number of sides.

Figure 5:
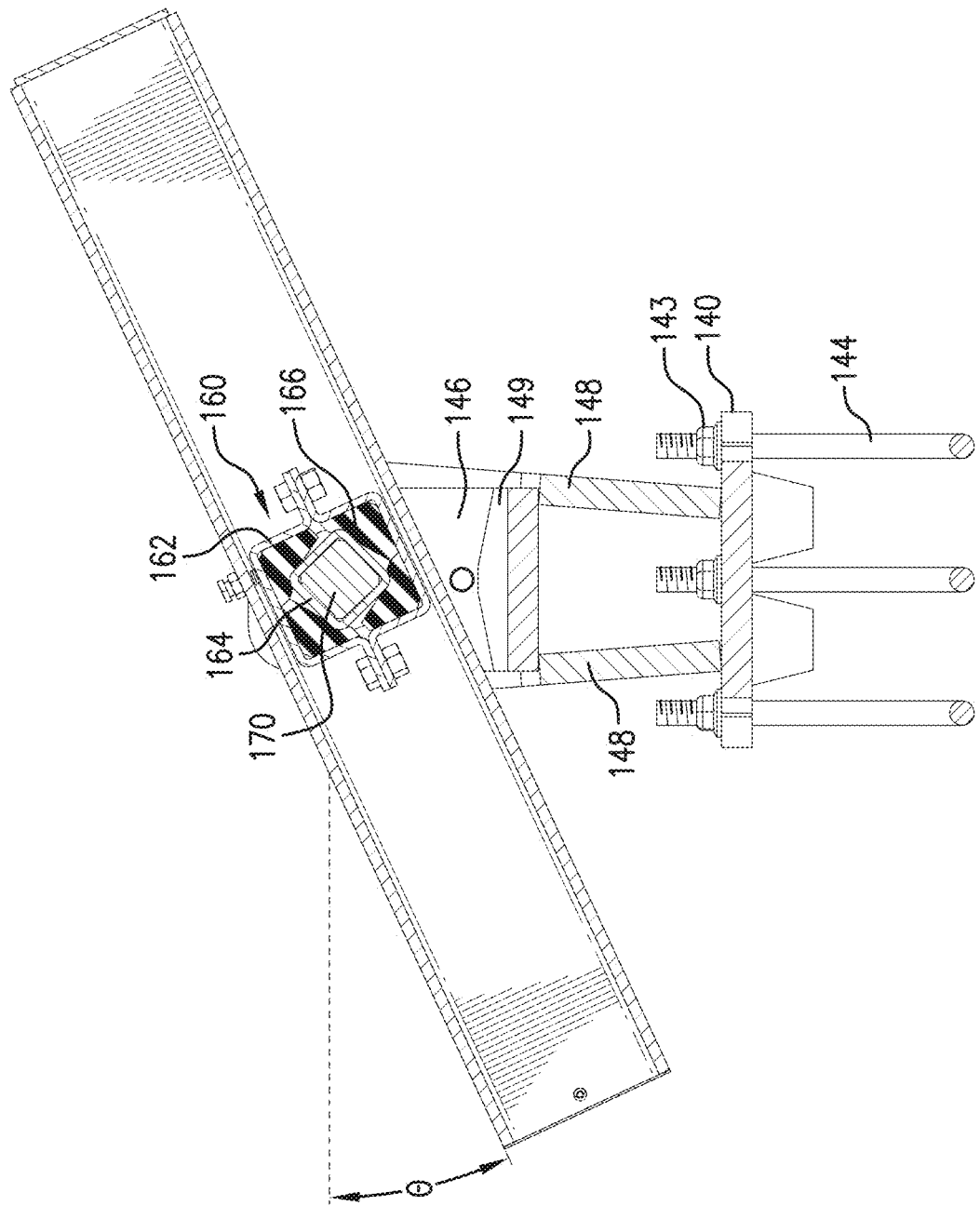
FIG. 5 is a top cross-sectional view of the dampening system taken from the view of 4-4 of FIG. 1.

Generally stated, with reference to FIG. 5, torsion block 160 is illustrated with having two square cross section tubes (outer casing 162 and inner tube 164). The cross section tube comprising outer casing 162, is about twice as large as that of inner tube 164 such that inner tube 164 fits within outer casing 162 oriented at 45 degrees between the flat faces of the respective outer casing 162 and inner tube 164. In this manner, inner tube 164 appears like a diamond within the square cross section of outer casing 162 with four empty spaces surrounding inner tube 164. Four inserts 166, which can be made of an elastomeric material such as a polymer or rubber are inserted into these four spaces.

Returning to FIG. 4, a pivot 170 from pivot assembly 137 extends through through hole 150 of pair of mounting plates 146 and through inner tube 164 of torsion block 160. Pivot 170 can comprises of a cross-section comprising a plurality of sides equal to the number of sides of inner tube 164. Torque is thus transmitted from swivel bar 134 to pivot 170 through inserts 166, which absorb both torsion shock and side-to-side oscillating loads and urges swivel bar 134 back to its steady state position.

Pivot assembly 137 further comprises of a pair of bushings 172 on pivot 170 positioned on opposite sides of swivel bar 134. Bushings 172 can be wear devices made of a plastic or nylon material. A pair of wear pads 174 are also positioned on pivot 170 to rest in contact with the outer surface of swivel bar 134. Similarly wear pads 174 can be made of plastic or nylon. A pair of washers 154 can be welded on the top and bottom of swivel bar 134 aligned with through hole 152 to increase the surface area and strength around through hole 152 of swivel bar 134. Each washer of pair of washers 154 can abut against the corresponding wear pad of pair of wear pads 174 to prevent metal on metal contact.

Pivot assembly 137 is fixed to bracket assembly 132. In the illustrated embodiment, a plate 176 is attached to the top of pivot 170 and fixed to one of pair of mounting plates 146 of bracket assembly 132. In this arrangement, as can be seen in FIG. 5, swivel bar 134 pivots laterally in the horizontal plane about pivot 170 with any jostling or oscillations absorbed by resilient device 136. In order to limit the amount of travel of swivel bar 134, a stop 149 can attached between bracket assembly 132 and swivel bar 134. In the illustrated embodiment, stop 149 is attached to a cross plate 147 that extends between spaced apart support members 148 of bracket assembly 132. Stop 149 can be implemented as a pair of members attached to spaced apart support members 148 with one on each side of swivel bar 134. In operation, swivel bar 134 can pivot twenty degrees ($\Theta$ in FIG. 5) in each direction limited by stop 149. In other embodiments, swivel bar 134 can pivot at an angle $\Theta$ of one degree to thirty degrees (including any value in between) each direction limited by stop 149.

One of the advantages of resilient device 136 is that it is fully contained inside swivel bar 134 to protect resilient device 136 from dust in the field. Farming, especially hauling, spreading or injecting liquid manure is dust, dirty and messy. Any exposed parts are susceptible to corrosion or abrasion. With resilient device 136 implemented as torsion block 160, inserts 166 are insulated from the outer environment by swivel bar 134 and outer casing 162.

Various modifications are envisioned to dampening system 130 disclosed herein. Resilient device 136 can also be implemented as one or more biasing members, such as spring, a cylinder (hydraulic or pneumatic), or a resilient material such as rubber or polymer or the like. When swivel bar 134 pivots laterally about pivot 170, resilient device 136 is compressed and its resiliency urges it back to its steady state position thus forcing swivel bar 134 back to its lateral position that is generally perpendicular with respect to the direction of travel. Any type of resilient device 136 is contemplated in this disclosure.

One skilled in the art will recognize that the foregoing disclosure is equally applicable to any agricultural implement connected to toolbar 106. While the illustrated embodiment shows the agricultural implement implemented as manure injector 120 connected to toolbar 106 any type of agricultural implement useful for agricultural operations can be used, such working tools include, but are not limited to, other types of manure injectors, manure applicators, tillers, planters, and the like.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A manure injection system comprising:
   a toolbar operatively connectable to a tanker by a hitch;
   a bracket assembly connected to the toolbar;
   a swivel bar pivotally connected to the bracket assembly and positioned parallel to the toolbar for pivoting in a horizontal plane with respect to the toolbar and adapted for receiving at least one agricultural implement connectable to the swivel bar;
   a resilient device positioned inside the swivel bar; and
   a pivot combined to the bracket assembly and extending through the swivel bar and engaging the resilient device.

2. The manure injection system of claim 1, wherein the resilient device is a torsion block that comprises: an outer casing comprising a plurality of sides; an inner tube comprising a plurality of sides; and a plurality of inserts each one of which is positioned between one of the plurality of sides of the inner tube and the outer casing.

3. The manure injection system of claim 2, wherein the outer casing of the torsion block further comprises four sides; and wherein the inner tube further comprises four sides; and further comprising four inserts each one of which positioned between one of the four sides of the inner tube and the outer casing.

4. The manure injection system of claim 3, wherein the inner tube is rotated forty five degrees with respect to the outer casing such that each one of the four sides of the inner tube is rotated forty five degrees with respect to a corresponding one of the four sides of the outer casing.

5. The manure injection system of claim 2, wherein the pivot extends through the inner tube of the torsion block.

6. The manure injection system of claim 2, wherein when the swivel bar rotates with respect to the pivot and the torsion block dampens movement of the swivel bar and urges it back to position.

7. The manure injection system of claim 2, wherein the torsion block is fully contained in the swivel bar to protect the plurality of inserts inside the torsion block from dust.

8. The manure injection system of claim 2, wherein the plurality of inserts each comprise elastomeric inserts each of which when compressed returns to its uncompressed state.

9. The manure injection system of claim 1, wherein the bracket assembly further comprises of a pair of mounting plates spaced apart vertically and positioned on opposite sides of the swivel bar each of which comprising a through hole aligned with the pivot which extends there-through.

10. The manure injection system of claim 9, wherein the resilient device comprises of a torsion block comprising of an outer casing comprising a plurality of sides, an inner tube comprising a plurality of sides, and a plurality of inserts each one of which is positioned between one of the plurality of sides of the inner tube and the outer casing, and wherein the pivot extends through the through hole in the pair of mounting plates and through the inner tube of the torsion block.

11. The manure injection system of claim 10, wherein the pivot comprises of a cross-section comprising a plurality of sides equal to the plurality of sides of the inner tube.

12. The manure injection system of claim 11, wherein the inner tube comprises four sides and the pivot comprises four sides.

13. The manure injection system of claim 12, wherein the pivot is fixed to the bracket assembly.

14. The manure injection system of claim 13, wherein the pivot is fixed to one of the pair of mounting plates of the bracket assembly.

15. The manure injection system of claim 14, and further comprising: a pair of bushings disposed on the pivot and positioned between the pivot and the inner tube of the resilient device; and a pair of wear plates disposed on the pivot and positioned between the pair of mounting plates and the swivel bar.

16. The manure injection system of claim 1, wherein the swivel bar is adapted to receive two agricultural implements with one agricultural implement attached to each side of the swivel bar separated by the pivot.

17. A manure injection system comprising:
   a toolbar operatively connectable to a tanker by a hitch;
   a swivel bar pivotally connected to the toolbar for pivoting in a horizontal plane and adapted for receiving at least one agricultural implement connectable to the swivel bar;
   a bracket assembly connected to the toolbar and comprising of a pair of mounting plates spaced apart vertically and positioned on opposite sides of the swivel bar each of which pair of mounting plates comprising a through hole;
   a resilient device comprising of a torsion block comprising of an outer casing comprising a plurality of sides, an inner tube comprising a plurality of sides, and a plurality of inserts each one of which is positioned between one of the plurality of sides of the inner tube and the outer casing;
   a pivot comprising of a cross-section with a plurality of sides equal to the plurality of sides of the inner tube and extending through the through hole in the pair of mounting plates and through the inner tube of the torsion block that is positioned inside the swivel bar;

a pair of bushings disposed on the pivot and positioned between the pivot and the inner tube of the resilient device; and a pair of wear plates disposed on the pivot and positioned between the pair of mounting plates and the swivel bar.

18. The manure injection system of claim 17, wherein the outer casing of the torsion block further comprises four sides; and wherein the inner tube further comprises four sides; and further comprising four inserts each one of which positioned between one of the four sides of the inner tube and the outer casing.

19. The manure injection system of claim 18, wherein the inner tube is rotated forty five degrees with respect to the outer casing such that each one of the four sides of the inner tube is rotated forty five degrees with respect to a corresponding one of the four sides of the outer casing.

\* \* \* \* \*